July 14, 1936.  M. D. THOMAS  2,047,526
AUTOMATICALLY MEASURING TRACES OF GASES
Filed July 6, 1932  3 Sheets-Sheet 1

INVENTOR
Moyer D. Thomas
BY
Austin & Dix
ATTORNEYS

July 14, 1936. M. D. THOMAS 2,047,526
AUTOMATICALLY MEASURING TRACES OF GASES
Filed July 6, 1932 3 Sheets-Sheet 2
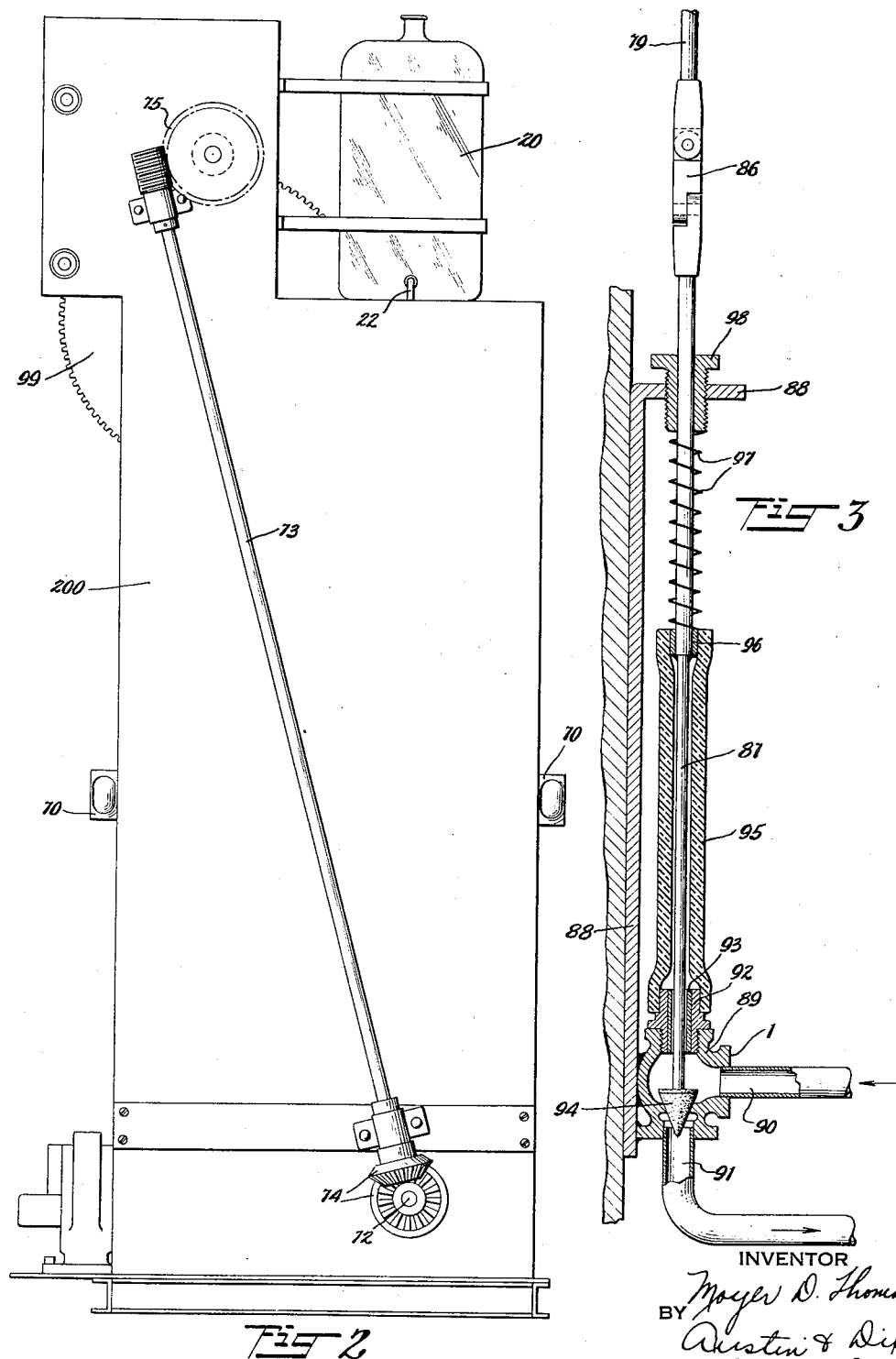

July 14, 1936.  M. D. THOMAS  2,047,526
AUTOMATICALLY MEASURING TRACES OF GASES
Filed July 6, 1932   3 Sheets-Sheet 3
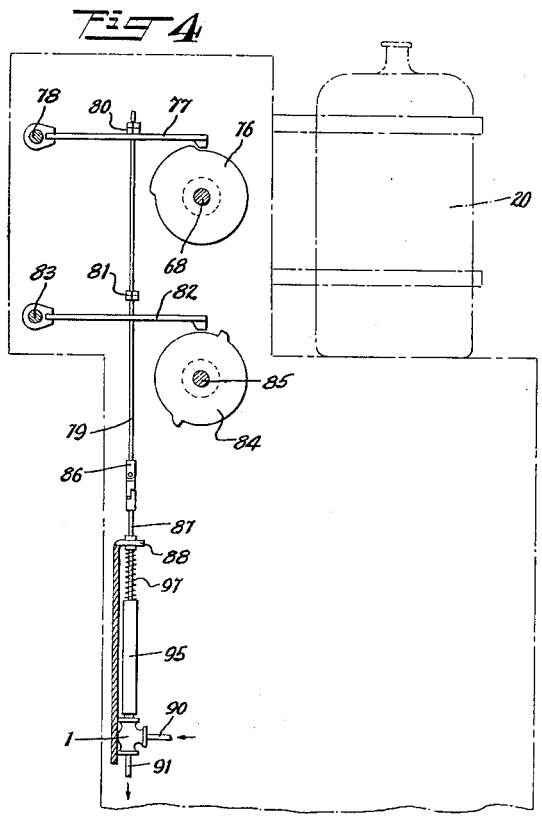
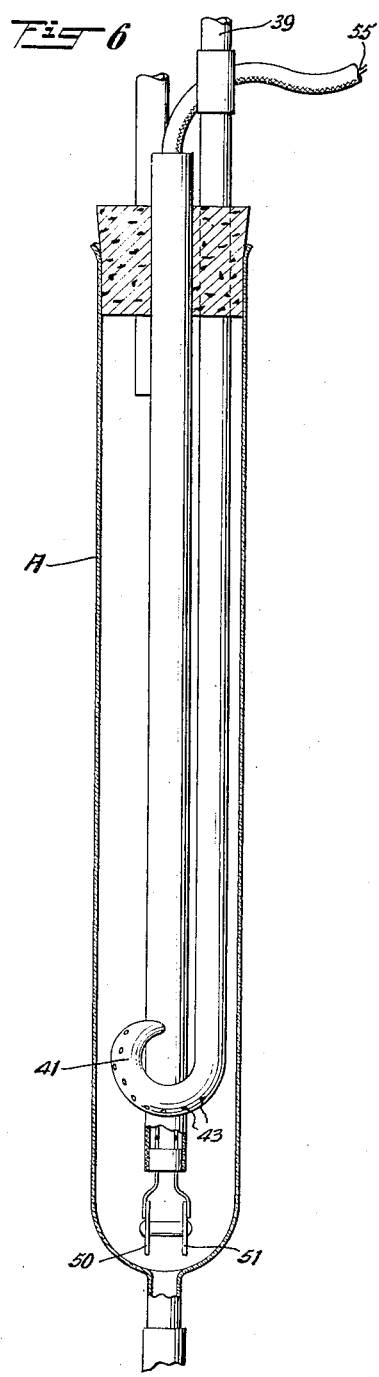
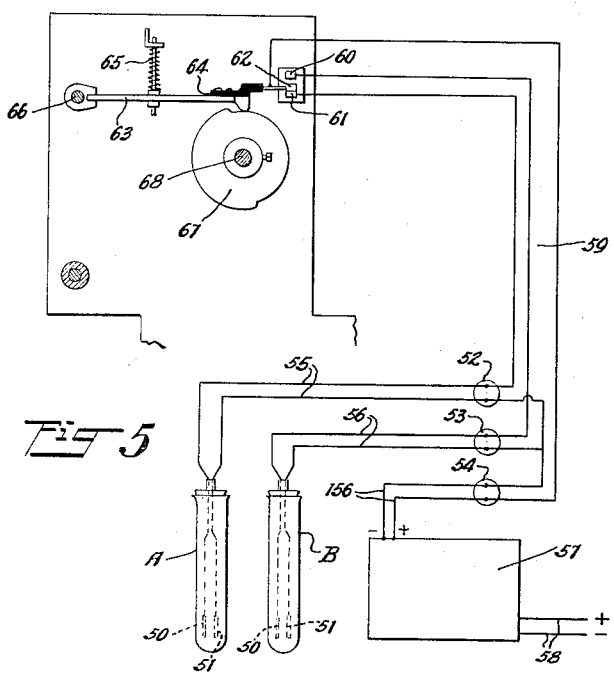
INVENTOR
Moyer D. Thomas
BY Austin + Dix
ATTORNEYS Patented July 14, 1936

2,047,526

UNITED STATES PATENT OFFICE 2,047,526

AUTOMATICALLY MEASURING TRACES OF GASES

Moyer D. Thomas, Salt Lake City, Utah, assignor to American Smelting & Refining Company, New York, N. Y., a corporation of New Jersey Application July 6, 1932, Serial No. 621,024

8 Claims. (Cl. 23—256)

The invention relates to the measurement of small concentrations of gases, and more particularly to apparatus for automatically measuring small concentrations of gases, such as, sulphur dioxide and carbon dioxide in air or in flue gas.

According to a preferred form of the invention, the apparatus may be mounted within a suitable casing, which may be arranged to be portable. The apparatus may comprise first and second absorbers to which a suitable reagent is fed and through which the gas to be tested may be aspirated. Suitable means may be provided for measuring the effect of the sample on the reagent, such as, a pair of electrodes, the resistance between which is measured by suitable apparatus.

If desired, the system may be arranged so that while one absorber is aspirating the sample, the other may be draining its used reagent, and may be being filled with fresh reagent.

In some cases, particularly when the system is used in connection with a fumigating cabinet for measuring the absorption of sulphur dioxide by plants, it is desirable to measure the concentration of the sulphur dioxide at two different points, such as, at the inlet and outlet of the fumigating cabinet. In this case the apparatus may be arranged to aspirate the sample from the fumigation cabinet inlet by the first absorber and to aspirate the sample from the fumigation cabinet outlet by the second absorber for a predetermined number of readings. If desired, to increase accuracy after a predetermined number of aspirations, the sources may be reversed with respect to the absorbers. For further accuracy, arrangement may be made to aspirate pure air at predetermined intervals.

According to the invention, suitable valves, cam shafts and cams are provided for automatically controlling the various events, such as, the filling and draining of the absorbers, the aspiration of the gases through the absorbers and the transfer of the source from one absorber to the other.

An important feature of the invention is to provide a main cam shaft for controlling the filling, draining and suction operations and to provide an auxiliary and considerably slower speed cam shaft for controlling the transfer of sources and the aspiration of pure air.

If desired, provision may be made for controlling the filling and draining operations of the absorbers by the second cam shaft, also so that, if desired, a predetermined number of aspirations may be made through the same reagent to accumulate the effect thereon.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents diagrammatically the system according to the invention;

Fig. 2 is a side elevation of the cabinet for housing the apparatus;

Fig. 3 is a detail showing the construction of one of the valves;

Fig. 4 is a detail illustrating the valve operating mechanism;

Fig. 5 is a wiring diagram illustrating the transfer of the measuring instrument from one absorber to the other; and Fig. 6 is a detail of an absorber.

Figure 1:
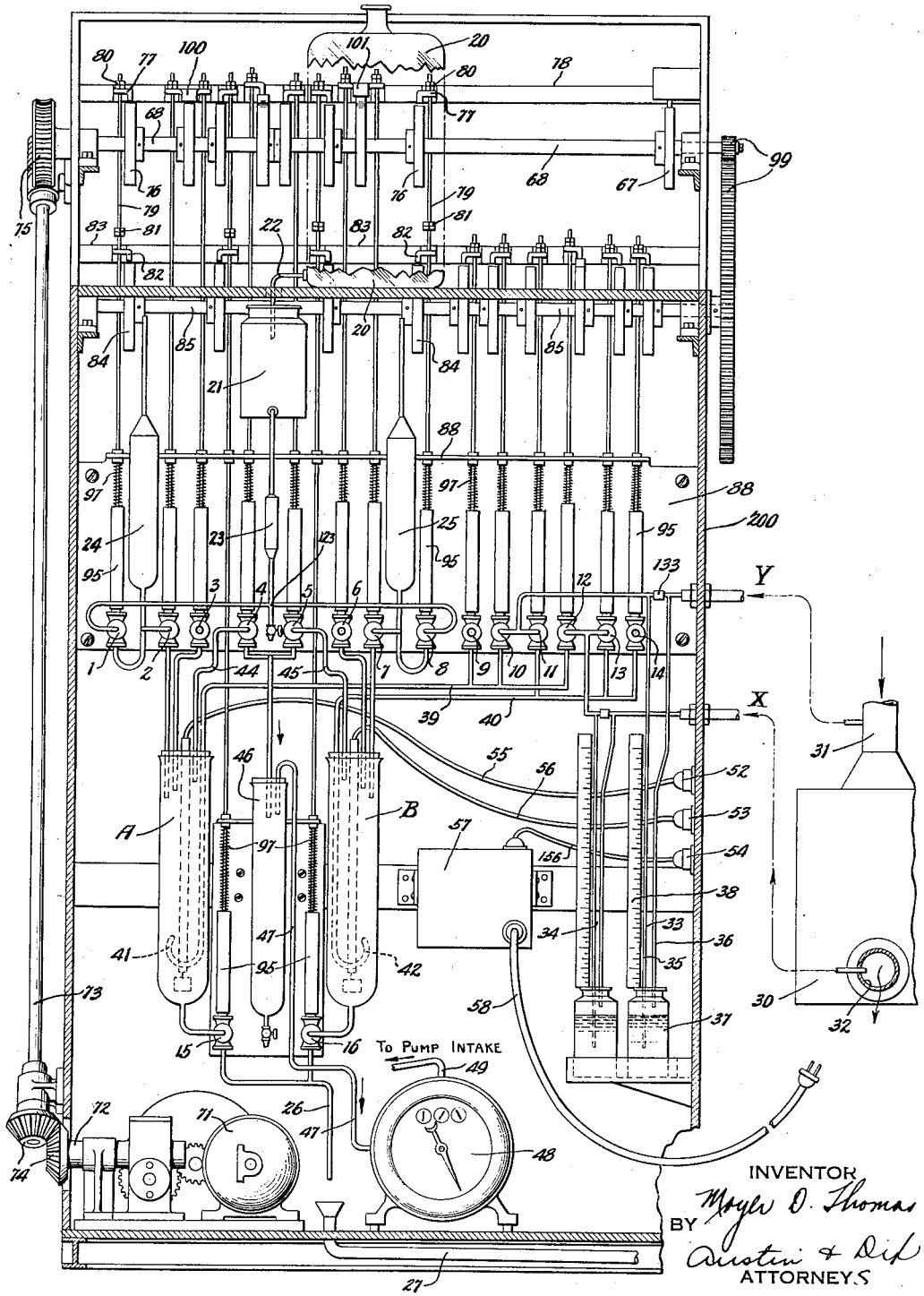

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, the various valves for controlling the several events are indicated by reference characters 1—16 inclusive. The entire apparatus is mounted within a cabinet or chamber indicated in general by 200 and made up of suitable structural members and having handles 70 projecting from both ends by means of which the cabinet may be carried about from place to place, if desired.

The top of the cabinet may be offset, as indicated in Fig. 2, upon which may rest a suitable bottle of reagent 20 secured thereto by any suitable devices, as indicated. The bottle 20 feeds a leveling bottle 21 by a pipe 22. Leveling bottle 21 may conveniently be of 500 c. c. capacity. From the leveling bottle 21, the reagent may flow by gravity through a glass wool filter 23 to a joint 123, whence it may flow to the supply valves 1 and 8. From the supply valves 1 and 8, the reagent may flow to pipettes 24 and 25 respectively, which may be of 100 c. c. capacity. These pipettes are for the purpose of measuring the amount of reagent fed to the absorbers A and B.

From pipettes 24 and 25, the reagent may flow by gravity through valves 2 and 7 respectively to fill absorber tubes A and B. Air outlet valves 3 and 6 respectively are provided to let the air escape when the absorbers A and B are being filled.

At the bottom of the absorbers A and B are drain valves 15 and 16 respectively for draining the used reagent through pipe 26 to any suitable place, such as, a waste pipe 27.

The present invention is shown for use with a fumigation cabinet for testing the absorption of sulphur dioxide by plants, but with slight modifications it may be used for other purposes, such as the measurement of fuel gas or for the measurement of traces of sulphur dioxide in the field, as will hereinafter be explained more in detail.

The fumigation cabinet is indicated diagrammatically by 30 and has an inlet 31 and an outlet 32 through which the sulphur dioxide passes. The material whose absorption of sulphur dioxide is to be tested, is contained in the fumigation cabinet 30. It is desired to measure the concentration of sulphur dioxide both at the inlet and outlet of the fumigation cabinet and these points are denoted for convenience by X and Y.

For aspirating the gas samples through the absorbers, a suitable pump (not shown) is provided for sucking the gases from the points X and Y. The gas from these points passes through flow meters 33 and 34 which are identical in construction. The flow meter 33, for example, may comprise tubes 35 and 36 connected to opposite sides of a restricted throat 133 and connected to a jar of liquid 37. A scale 38 may be provided and the difference in level of the liquid in the tubes 35 and 36 is a measure of the flow of gas to the meters, as will be understood by those skilled in the art.

The conduits from the sources X and Y, after passing through the flow meters 34 and 33, pass to transfer valves 12, 13, 10 and 11 respectively. Pipe 39 connects valves 10 and 12 and also pure air valve 9 to aspirator 41 of absorber A. Pipe 40 connects valves 11 and 13 and also pure air valve 14 to the aspirator 42 of absorber B. It will be understood that the aspirator tubes have holes in the bottom thereof, as indicated by the holes 43 in the aspirator tube 41 in Fig. 6.

Suction pipes 44 and 45 respectively pass out of absorbers A and B to suction valves 4 and 5 respectively which are connected to trap 46. Trap 46 in turn is connected by pipe 47 to a Sargent wet test volume flow meter 48 to the small steady suction pump mentioned above (not shown). This pump may be a Crowell pump and is connected to the volume flow meter 48 by pipe 49.

For measuring the effect on the conductivity of the reagent by the gas to be tested, each absorber is provided with a pair of electrodes through which a current is passed, the amount of which is indicated by a suitable meter. These electrodes are denoted by 50 and 51 in absorber A (Fig. 6).

The wiring diagram is shown best in Fig. 5 and contains an arrangement for alternately connecting the recording meter 57 first to one absorber A and then to the other absorber B. For this purpose the upper or main cam shaft 68 is provided with a cam 67 which operates a follower 63 pivoted at 66 and normally held against the cam face by spring device 65. Follower 63 carries insulation 64 which in turn carries movable contact 62, which alternately engages fixed contacts 60 and 61.

If desired, for convenience, connectors 52, 53 and 54 may be provided. Wires 55 connect the electrodes of absorber A to connector 52. Wires 56 connect the electrodes of absorber B to connector 53 and wires 156 connect the recording meter 57 to connector 54. These connectors are wired together as shown and are provided with three wires, indicated by 59, which connect the movable and fixed contacts 62, 61 and 60. A source of direct current is connected to the recording meter 57 by wires 58. The recording meter may be any well known type suitable for such purposes, for example, a Leeds & Northrup Recording Wheatstone Bridge having a paper speed of eight inches per hour.

As above stated, the cabinet or casing in which the gas to be measured is contained, may be of any suitable construction, being made of suitable structural frame members to which wall plates are secured. For driving the various apparatus, an electric motor 71 may be provided, driving the shaft 72 through suitable gear reduction devices. This motor may also drive the suction pump (not shown). The shaft 72 is connected to an oblique shaft 73 on the outside of the cabinet through bevel gears 74. Shaft 73 in turn drives the upper slow speed main shaft 68 by a worm and worm wheel indicated by 75.

The upper slow speed main shaft 68 may move at any desired or necessary speed as, for example, one revolution every four minutes. If desired, for controlling the various events, for reasons explained more fully below, a second shaft 85 may be provided, driven by gears 99 from shaft 68 at a considerably lower speed as, for example, one revolution every sixty-four minutes. It will be noted that each of the shafts 68 and 85 have cams thereon which operate followers, which in turn operate the several valves which control the various events. Since these cams, followers and valves are similar in construction only one will be described in detail.

Referring now to Fig. 4, valve 1 may be placed under control of either cam 76 or cam 84. As shown, the valve spindle 87 is connected to rod 79 through a flexible coupling 86. Rod 79 has a pair of lock nuts 80 in engagement with follower 77 pivoted at 78, and a second pair of lock nuts 81 adapted to be placed in engagement with follower 82 pivoted at 83, as will be explained more in detail below.

Referring now to Fig. 3, the valve 1 comprises a casing 89 to which the inlet pipe, denoted by 90, is connected and to which the outlet pipe, denoted by 91, is also connected. A conical rubber policeman tip, indicated by 94, seats on a suitable conical seat and is connected to valve spindle 87 as shown.

For guiding the spindle 87, a sleeve 92 is provided having a Babbitt lining 93. A sleeve 96 is secured to the spindle and a long length of yieldable rubber pipe is tightly secured to sleeves 96 and 92.

The entire valve arrangement may be soldered or otherwise secured to a support 88 through which an adjusting sleeve 98 may be threaded between which and the sleeve 96 coil spring 97 is positioned. As the cams 84 or 76 raise their followers, the spindle 87 will be pulled up against the spring 97, lifting the tip 94 off its seat and stretching the rubber boot 95, but insuring a fluid tight joint at the valve.

It will be noted that valves 2 and 3 are operated by the same follower 100 and that valves 6 and 7 are also operated by the same follower 101. This is for the reason that whenever the absorbers A and B are being filled, provision must be made at the same time to let the air escape.

It will be further noted that supply valves 1 and 8 may be operated by either shaft 68 or 85, as is also true of the drain valves 15 and 16. As shown, these valves are not normally operated by the lower shaft, since the nuts 81 are in upper position. By placing the nuts 81 in lower position and raising the upper nuts 80, these valves, namely, 1, 8, 15 and 16, may be operated by the lower shaft 85 instead of the upper shaft 68 for preventing periodic draining and refilling of these absorbers for each aspiration, and causing repeated aspirations in the same reagent to obtain an accumulative effect. This may be very desirable in the case of measuring very small concentrations.

It is thought that the operation of the system will be apparent from the description given above, it being understood that the various cams are arranged to open the various valves at the desired time to obtain the results desired.

For example, absorbers A and B may be operated upon a four minute cycle. Absorber A aspirates for two minutes while absorber B is draining and refilling for the same period of time; absorber A then draining and refilling for the remaining two minutes, while absorber B is aspirating for the same period of time.

When used in connection with the fumigating cabinet 30, each absorber may be connected to take its sample from one of the sources X and Y, the other absorber being connected to the other source. Furthermore, each absorber may take one aspiration of pure air after a predetermined number of samples has been taken. For example, absorber A may take one aspiration of pure air and then seven consecutive aspirations from source X. B in between times will take one aspiration of pure air and seven consecutive aspirations from source Y. Then A and B may each take a single aspiration of pure air after which A may take seven consecutive aspirations from source Y, while B takes seven consecutive aspirations from source X in between times. The advantage of taking periodic aspirations of pure air gives a check on the apparatus and the advantage of transferring the sources X and Y with respect to the absorbers A and B acts to check up any difference there may be in the separate absorber systems.

In case it is desired to take repeated aspirations through the same reagent to obtain an accumulative effect with very rare concentrations, it is only necessary to place the valves 1, 8, 15 and 16 under the exclusive control of shaft 85 which prevents periodic draining and refilling of the absorbers for a given length of time for example 16 minutes.

Although, in the form shown, the apparatus is adapted for measuring the absorption of sulphur dioxide by plants in a fumigation cabinet, by small modifications and changes the apparatus may be used for measuring sulphur dioxide in the field and sulphur dioxide concentrations in flue gases. Absorption of sulphur dioxide by plants may be made of from less than $\frac{1}{10}$ part per million (p. p. m.) to 50 parts per million. Small concentrations of sulphur dioxide in the field may be made with a range of .01 to about 7.0 p. p. m. Higher concentrations up to about 6% in flue gases, which are low in sulphuric acid, but which contain appreciable amounts of carbon dioxide may be made.

Although different reagents may be used for different gases, it has been found that slightly acidulated hydrogen peroxide solution gives excellent results for measuring sulphur dioxide. In the case of measuring sulphur dioxide in the field and measuring the absorption of sulphur dioxide by plants in fumigation cabinets, the absorbent reagent may contain about .003% hydrogen peroxide and .0005% sulphuric acid. In the case of measuring sulphur dioxide in flue gases the solution will contain more peroxide.

The increased conductance of the solution, as indicated on the recording Wheatstone bridge 57, gives a measure of the sulphur dioxide absorbed. From the curves obtained on the recording Wheatstone bridge and from the known volumes of gas aspirated, the data desired can be obtained.

In the case of measuring absorption by plants, it is thought that the two minute aspirating time of each absorber is sufficiently small so that the samples from the intake and outlet in the fumigation cabinet 30 may be considered to be taken virtually simultaneously, and results will be accurate unless the concentration in the cabinet is fluctuating rapidly. In the case of very short fumigations of the order of fifteen minutes or less, it may be desirable to use two machines.

In the case of the field machine measuring concentrations in the open air, each solution may be aspirated for about twenty minutes, drawing about fifteen liters of air per minute. This large volume of air causes an appreciable evaporation of the absorbing liquid, with attendant cooling, but these two factors tend to compensate each other. The absorbers may be mounted snugly in heavy copper pipes, which reduce the cooling effect so that the latter offsets almost exactly the evaporation of the absorbing liquid.

It will be understood that the machine may be modified such as to obtain different periods of aspirations and certain features may be eliminated, if desired. Also other gases may be measured and other reagents may be used.

While certain novel features of the invention have been disclosed and are pointed out in the annexed claims, it will be understood that various omissions, substitutions and changes may be made by those skilled in the art without departing from the spirit of the invention.

What is claimed is:

1. In a system for measuring traces of gases, an absorber, means for periodically aspirating the gas sample thru said absorber, means for periodically filling said absorber with reagent and then draining the same, periodically actuated means for suspending the filling and draining operations to permit a plurality of aspirations to be made in the same reagent.

2. In a system for measuring traces of gases, an absorber, means for periodically aspirating a gas sample thru said absorber, means including a controlled connection to a pure air source for periodically aspirating pure air thru said absorber as a check, and means for testing the effect of said sample on the reagent in said absorber.

3. In apparatus for measuring traces of gases, first and second absorbers, means for aspirating the gas to be tested through said absorbers, a first source of sample, a second source of sample, first and second valves connected to said first source and to said absorbers respectively, third and fourth valves connected to said second source and to said absorbers respectively, time controlled valve actuating means for alternately opening only said first and fourth valves, whereby said first absorber aspirates samples of gas from said first source and said second absorber aspirates samples of gas from said second source alternately with said first aspirations for a given number of times, and means to transfer said actuating means to control only said second and third valves in a similar manner, whereby said sources are reversed with respect to said absorbers.

4. In apparatus for measuring traces of gases, first and second absorbers, means for aspirating the gas to be tested through said absorbers, a first source of sample, a second source of sample, first and second valves connected to said first source and to said absorbers respectively, third and fourth valves connected to said second source and to said absorbers respectively, a pure air valve connected to each absorber, control rods for actuating said valves, a cam shaft having cams cooperating with said control rods for controlling said valves and comprising cams for alternately opening said pure air valves, whereby each absorber first aspirates pure air alternately, cams for subsequently alternately opening said first and fourth valves, whereby said first absorber aspirates samples of gas from said first source and said second absorber aspirates samples of gas from said second source alternately with said first aspirations for a given number of times, and cams for subsequently alternately opening said second and third valves, whereby the sources are reversed with respect to the absorbers.

5. In a system for automatically measuring traces of gases, first and second absorbers, a source of reagent, a leveling container fed by said source, first and second measuring containers fed by said leveling container, first and second absorbers fed by said measuring containers respectively, first and second feed valves between said leveling container and measuring containers respectively, first and second control valves between said measuring containers and absorbers respectively, first and second drain valves for draining said absorbers respectively, first and second sources of gases to be measured, a suction pump, conduits connecting said pump and said absorbers, first and second control valves in said conduits, aspirators in said absorbers, conduits connecting said sources to said aspirators, valves means for changing said sources with respect to said aspirators, a pair of electrodes in each absorber and means for measuring the gas current flow through said absorbers.

6. In a system for automatically measuring traces of gases, first and second absorbers, a source of reagent, a leveling container fed by said source, first and second pipettes fed by said leveling container, first and second absorbers fed by said pipettes respectively, first and second feed valves between said leveling container and pipettes respectively, first and second control valves between said pipettes and absorbers respectively, first and second drain valves for draining said absorbers respectively, first and second sources of gases to be measured, a suction pump, a trap connected to said suction pump, conduits connecting said trap and said absorbers, first and second control valves in said conduits, aspirators in said absorbers, a pair of valves connected to said first source and connected to said aspirators respectively, a pair of valves connected to said second source and also connected to said aspirators respectively, a pair of electrodes in each absorber and means for measuring the gas current flow through said absorbers.

7. In a gas analysis apparatus, first and second absorbers, means for alternately aspirating gas to be tested through said absorbers, said means comprising gas suction valves, a source of reagent, conduits between said source and said absorbers, supply control valves in said conduits, drain valves in said absorbers, control rods for each of said valves, a high speed cam shaft and a slow speed cam shaft, cams on said high speed shaft cooperating with said rods for controlling said reagent supply valves, said drain valves and said gas suction valves, cams on said slow speed shaft adapted to cooperate with said filling and draining control rods, and means for selectively giving the control of said supply and drain valves to either of said sets of cams whereby the number of aspirations through the same reagent may be varied.

8. In a gas analysis apparatus, first and second sources of samples, first and second absorbers, means comprising gas intake valves for alternately aspirating gas from said sources through said absorbers, pure air intake valves for said absorbers, a source of reagent, conduits for supplying said reagent to said absorbers, supply valves for controlling the passage of reagent through said conduits, drain valves for said absorbers, gas suction valves for controlling the suction of gas through said absorbers, control rods for all said valves, a main cam shaft, an auxiliary cam shaft, cams on said main shaft cooperating with said supply, drain and suction control rods to control said valves, auxiliary cams on said auxiliary shaft adapted to cooperate with said supply and drain control rods and said gas and air intake control rods, and means to shift the control of said supply and drain valves from said main shaft to said auxiliary shaft whereby the number of aspirations through a single charge of reagent may be changed.

MOYER D. THOMAS.